Figure 1:
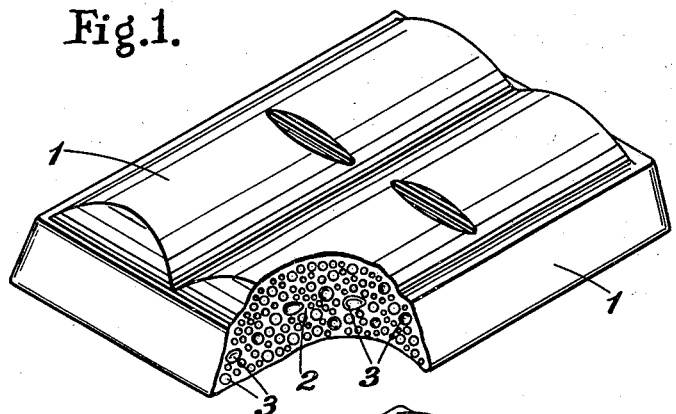

June 1, 1937.  J. W. TODD  2,082,312
MANUFACTURED ARTICLE OF FOOD OR CONFECTIONERY AND
IN COMBINATIONS OF THE SAME WITH COVERINGS
Filed June 18, 1936

INVENTOR
JOHN W. TODD
By D. P. Wollcam Atty.

Patented June 1, 1937

2,082,312

UNITED STATES PATENT OFFICE 2,082,312

MANUFACTURED ARTICLE OF FOOD OR CONFECTIONERY AND IN COMBINATIONS OF THE SAME WITH COVERINGS

John William Todd, East London, Union of South Africa

Application June 18, 1936, Serial No. 86,001
In Great Britain July 11, 1935

2 Claims. (Cl. 99—138)

This invention relates to manufactured articles of food or confectionery and to combinations of the same with coverings or wrappings, said articles consisting entirely of, or having parts, for instance, centres, consisting entirely of, an edible fatty medium, which is fluid, liquid, or semi-liquid, or molten, at temperatures exceeding about 90° F. or 32° C., for instance, cocoa-butter, and which may contain one or more edible ingredients, such as, for example, sugar, cocoa, milk, biscuit, nuts, raisins and other fruit, or fondant cream.

The materials, that is, the edible fatty medium with its ingredients, may have been ground together to form a homogeneous paste at temperatures exceeding about 90° F. or 32° C. On the other hand the edible fatty medium may contain one or more edible ingredients which remain whole, or in fractions or portions of comparatively considerable magnitude. For instance, biscuit, nuts and raisins may remain in this form. The edible fatty medium may however contain one or more ingredients which have been ground with it and in addition one or more ingredients which have been added whole or in fractions or portions of comparatively considerable magnitude and which remain in this form.

An article according to the present invention is composed of, or comprises, a part which is composed of, an edible fatty medium, which is fluid, liquid, semi-liquid, or molten, at temperatures exceeding about 90° F. or 32° C., and which tends to become more rigid at temperatures below said temperature, and which may contain (in the manner indicated above by way of example) one or more edible ingredients, such as, for example, sugar, cocoa, milk, biscuit, nuts, raisins and other fruit, and fondant cream, and which at ordinary temperatures up to about 80° F. or 26° C. possesses a cellular structure or substantially honeycombed formation, the individual cells or cavities being filled with gas at sub-atmospheric, atmospheric, or super-atmospheric pressure. Hitherto the structure of articles or parts of articles formed from such substances has been substantially compact or homogeneous at all ordinary temperatures, or the articles or parts thereof have contained non-uniform irregular elongated cavities, or open or closed passages, similar to spaces left between contiguous strata of material, or the structure has been similar to that of a conglomeration of a great number of small tubes.

The term "cellular structure" is in this specification to be understood to mean a honeycombed structure or formation comprising an exceedingly large number of separate closed cavities, the vast majority of which are more or less spherical, globular or ellipsoidal in shape, or are of an irregular (for instance, polygonal) shape in cross-section, and the dimensions of which in any three directions at right angles to one another are in the vast majority of cases substantially of the same order of magnitude (in contradistinction to the elongated cavities of stratified material or to the tubular cavities referred to above). Any two cross-sections, at right angles to one another, of material possessing this cellular structure will present somewhat similar honeycombed appearances. The more the fatty medium contains permanently solid ingredients of irregular shapes and of a size more or less comparable to the size of the cavities the more irregular will the shapes of the cavities tend to be. The cavities are readily visible to the eye and the majority of the cavities may vary from a quarter of a millimetre to three millimetres in length or width. The average distance between the cavities may be three or four times the average width of the cavities, but preferably their distance apart is less than their width. The cavities may be of substantially uniform size.

The material constituting the whole article or those portions of it which possess a cellular structure is thus a physical dispersion, readily visible to the eye, of gas, at sub-atmospheric, atmospheric, or super-atmospheric pressure, in a solid edible medium or matrix, the gas being the disperse phase and in the form of globules or bubbles, and the edible fatty medium, with or without one or more edible ingredients, the continuous phase. This dispersion will hereinafter be termed a "gas-filled globular solidified dispersion", and it will be understood that the portions having a cellular structure, or in other words the cellular portions, are portions consisting of gas-filled globular solidified dispersions as defined above.

When an article according to the present invention is eaten, the cellular structure of the whole article or of part of the article makes the article easier to bite, through giving crispness to the article and through making it softer, that is, structurally weaker, and the cellular structure also makes the article more rapidly soluble in the mouth.

The substance of which the articles are composed may be, in whole or in part, chocolate. Thus an article according to the present invention may possess one part composed of chocolate having a cellular structure and another part composed of some other edible material, for example, biscuit. As a particular instance, the article may consist of cellular chocolate sandwiched with non-cellular chocolate, or with some other edible product.

The cavities may contain, for a short or long time after the manufacture of the article, air or gas under a pressure below or equal to or above atmospheric pressure according to the method of manufacture employed. The presence in the articles of cavities containing a considerable partial vacuum can be detected by the tongue, when the substance of which the article is composed dissolves, by a somewhat pleasant tingling sensation on the tongue.

The article manufactured may be cellular throughout. If desired, however, only the internal portion of the article may be cellular and the external portion be non-cellular and be chocolate or confectionery, for example. On the other hand only the external portion of the article may be cellular and the internal portion be of non-cellular edible material.

When an article according to the present invention, composed of chocolate, is broken in two through a part possessing the defined cellular structure the fracture through the cellular portion is practically always a clean fracture, that is to say, the break through said portion occurs without a large number of small independent pieces, crumbs, or flakes, splitting away from the two broken portions. Consequently an article according to the present invention is practically as convenient to handle as ordinary compact chocolate through not crumbling when broken in the hand to any appreciable extent. Moreover the cellular portions while being specifically very light are comparatively very strong if their weight be taken into account.

An article according to the present invention the external portions of which are wholly, or in part, cellular may be combined with an external covering of foil, card, or paper, or other inedible material, on to which in the course of manufacture the edible material has been poured and to which said material adheres more or less firmly so that a combination of the article with a covering is formed. The covering may however be applied, so that it adheres to a cellular part of the article in any suitable manner.

The articles according to the present invention may be manufactured by the process claimed and described in the specification of the co-pending patent application No. 86,002 filed June 18, 1936 and by the methods, set forth therein, for carrying out said process.

An article according to the present invention may be in the form of a large mass, of regular or irregular shape, for instance, a slab several feet long, suitable for being cut or broken up into a variety of pieces of various shapes.

Several articles according to the invention are illustrated, merely by way of example, in the accompanying drawing in which:—

Figure 2:
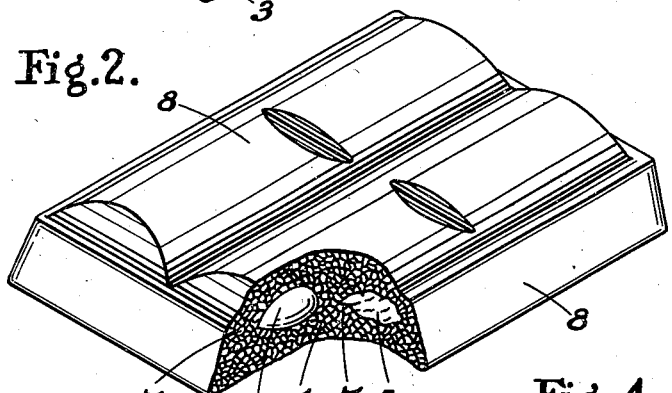
Figure 3:
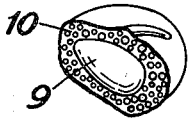
Figure 4:
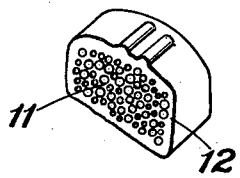
Figure 6:
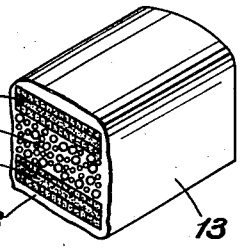
Figure 5:
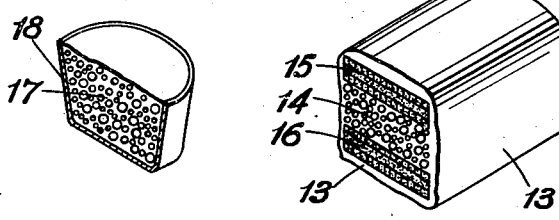

Fig. 1 is a perspective view of a tablet of chocolate, one corner being broken off, Fig. 2 a perspective view of a tablet of chocolate containing nuts and raisins, one corner being broken off, Fig. 3 a perspective view of the broken off half of an article of confectionery having a central nut and an outer layer of cellular chocolate, Fig. 4 a perspective view of the broken off half of an article of confectionery having a central cellular portion of chocolate and an outer non-cellular layer of sugar icing, Fig. 5 a perspective view of the broken off end of a sandwich containing within an outer lining of chocolate a layer of cellular chocolate between two layers of biscuit, and Fig. 6 a perspective view of the broken off half of an article of confectionery consisting of a body of cellular chocolate in combination with an external covering of foil adhering to said cellular chocolate.

Referring to Fig. 1, the tablet consists of an outer covering or lining 1 of non-cellular chocolate enclosing an internal mass of cellular chocolate 2, the individual cavities 3, 3, of which are at a comparatively large distance apart and are mostly more or less spherical in shape.

The tablet shown in Fig. 2 consists of a mass of cellular chocolate 4 containing raisins and nuts, one raisin 5 being shown and one nut 6. The individual cavities 7, 7, are much closer together than the cavities 3, 3, of the tablet shown in Fig. 1, so that in general the cavities are polygonal in cross-section. Cavity walls constitute the external superficial portion 8 of the tablet, no separate lining of non-cellular chocolate having been provided in the course of manufacture.

In Fig. 3, 9 is a nut and 10 an outer layer of cellular chocolate.

In Fig. 4, 11 is a centre of cellular chocolate and 12 an outer layer of sugar icing.

In Fig. 5, 13 is the outer lining of non-cellular chocolate, and 14 a layer of cellular chocolate sandwiched between two layers 15, 16 of biscuit.

In Fig. 6, the body 17 of cellular chocolate is combined with an external covering 18 of foil which adheres to said cellular chocolate.

Articles according to the present invention (whether of chocolate or of other material) may be readily produced in the form of tablets of any required weight and shape, whether the whole article be cellular or whether the interior be cellular and the external portion be non-cellular.

What I claim is:—

1. An essentially fatty chocolate confection which, as an entirety, has a melting point in the neighborhood of 90° F., and which, as an entirety, is self-sustaining at normal atmospheric temperatures said confection having substantially uniformly distributed therethrough numerous separate readily visible non-communicating cavities enclosed by relatively thin non-splinterable walls which offer minimum resistance to cleavage and quickly collapse under melting heat.

2. An essentially fatty chocolate confection which, as an entirety, has a melting point in the neighborhood of 90° F., and which, as an entirety, is self-sustaining at normal atmospheric temperatures, said confection having substantially uniformly distributed therethrough numerous separate artificial non-communicating cavities varying from one quarter of a millimeter to three millimeters in length and width.

JOHN WILLIAM TODD.